United States Patent Office 2,984,662
Patented May 16, 1961

2,984,662
NOVEL 18-OXYGENATED STEROIDS AND PROCESS OF PREPARATION

Georges Muller, Nogent-sur-Marne, and Jacques Martel, Bondy, France, assignors to Les Laboratoires Francais de Chimiotherapie, Paris, France, a corporation of France No Drawing. Filed Jan. 4, 1961, Ser. No. 80,558

Claims priority, application France Jan. 15, 1960

14 Claims. (Cl. 260—239.55)

This invention relates to new 18-oxygenated steroids and, more particularly, to compounds of the following general formula:

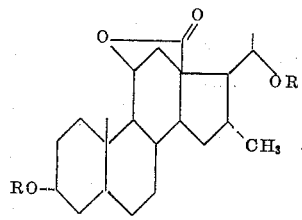

(I)

in which R represents hydrogen or an acyl radical of an organic carboxylic acid of 1 to 18 carbon atoms, particularly the 18-11 lactone of 3α,11β,20β-trihydroxy-16α-methyl-5β-pregnane-18β-oic acid and the 18-11 lactone of 3α,11β,20β-trihydroxy-16α-methyl-5β-pregnene-18β-oic acid-3,20-diacetate. The invention further relates to novel intermediates therefor.

18-oxygenated steroids such as aldosterone are already known. It is also known that one of the important intermediates in the preparation of aldosterone is 3α-acetoxy-11-oxo-18,20-oxido pregnane, prepared after the technique described in copending, commonly assigned United States application, Serial No. 38,722, filed June 27, 1960.

Applicants have discovered that it is possible to prepare 18,20 oxido steroids having a 16-methyl by treatment with lead tetraacetate in the presence of light without formation of 16,20 oxido steroids which result was not to be anticipated.

It is an object of the invention to obtain the 18-11 lactone of 3α,11β,20β-trihydroxy-16α-methyl-5β-pregnane-18β-oic acid and the 3,20-diacyloxy derivatives thereof which are novel intermediates for the preparation of 16α-methyl aldosterone, which has enhanced aldosteronic activity.

It is a further object of the invention to provide a process for preparing the 18-11 lactone of 3α,11β,20β-trihydroxy-16α-methyl-5β-pregnane-18-oic acid and the 3,20-diacyloxy derivatives thereof.

It is another object of the invention to obtain the following novel intermediates for the preparation of the 18-11 lactone of 3α,11β,20β-trihydroxy-16α-methyl-5β-pregnane-18-oic acid and the 3,20-diacyloxy derivatives thereof.

a. The 3α-acetoxy-11-oxo-20α-hydroxy-16α-methyl-5β-pregnane (IIIa),
b. The 3α-acetoxy-11-oxo-20β-hydroxy-16α-methyl-5β-pregnane (IIIb),
c. The 3α-acetoxy-11-oxo-18,20α-oxido-16α-methyl-5β-pregnane (IVa),
d. The 3α-acetoxy-11-oxo-18,20β-oxido-16α-methyl-5β-pregnane (IVb),
e. The 3α,20 - dihydroxy - 11,18 - dioxo - 18,20 - oxido-16α-methyl-5β-pregnane (V).

The process of the invention comprises selectively reducing the 20-oxo radical of 3α-acyloxy-11,20-dioxo-16α-methyl-5β-pregnane to form 3α-acyloxy-11-oxo-20-hydroxy-16α-methyl-5β-pregnane, cyclizing the latter to form 3α-acyloxy-11-oxo-18,20-oxido-16α-methyl-5β-pregnane, oxidizing and saponifying said 18,20-oxido compound to form 3α,20-dihydroxy-11,18-dioxo-18,20-oxido-16α-methyl-5β-pregnane and reducing the latter to form 18-11 lactone of 3α,11β, 20β-trihydroxy-16α-methyl-5β-pregnane-18β-oic acid. The 3,20-diesters of the 18-11 lactone may be formed by acylation. Table I is a schematic outline of the process of the invention.

TABLE I

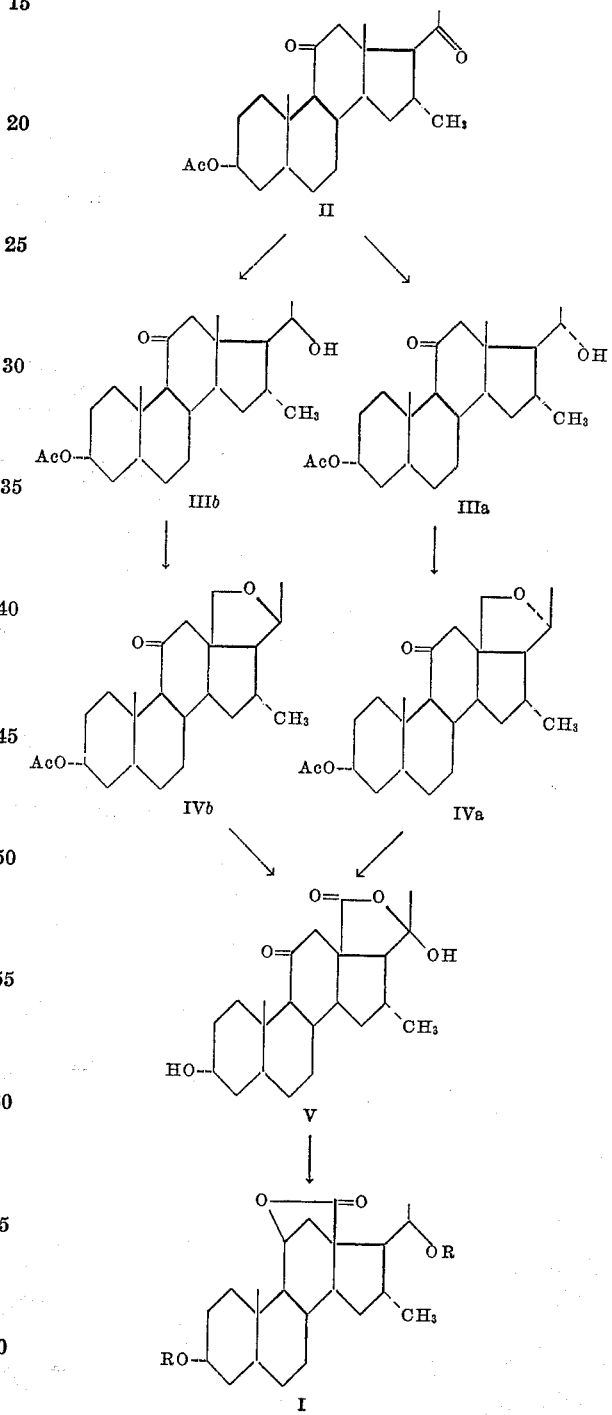

R represents hydrogen or the acyl radical of an ogranic carboxylic acid having from 1 to 18 carbon atoms.

The reduction of 3α-acyloxy-11,20-dioxo-16α-methyl-5β-pregnane is advantageously effected with an alkali metal borohydride in an anhydrous lower alkanol such as sodium borohydride in absolute ethanol. The cyclization of 3α-acyloxy-11-oxo-20-hydroxy-16α-methyl-5β-pregnane may be effected at elevated temperatures in the presence of white light and a lead tetraacetate in an inert organic solvent such as benzene. The oxidation of 3α - acyloxy - 11 - oxo - 18,20 - oxido - 16α - methyl-5β-pregnane may be effected at room temperatures with an oxidizing agent such as sulfochromic acid and the subsequent saponification of the 3α-acyloxy group may be performed at room temperature under alkaline conditions with an alkali metal or alkaline metal hydroxide as preferred alkaline agents. Sodium hydroxide is a preferred agent because of easy availability. The reduction of 3α,20-dihydroxy-11,18-dioxo-18,20-oxido-16α-methyl-5β-pregnane is preferably performed with an alkali metal borohydride such as sodium borohydride and is followed by acidification with an inorganic acid such as hydrochloric acid or sulfuric acid.

The 18,11 lactone of 3α,11β,20β-trihydroxy-16α-methyl-5β-pregnane-18β-oic acid is a valuable intermediate for the production of 16α-methyl-aldosterone which possesses enhanced aldosterone activity. The reaction scheme for the preparation of 16α-methyl aldosterone is illustrated in Table II.

TABLE II

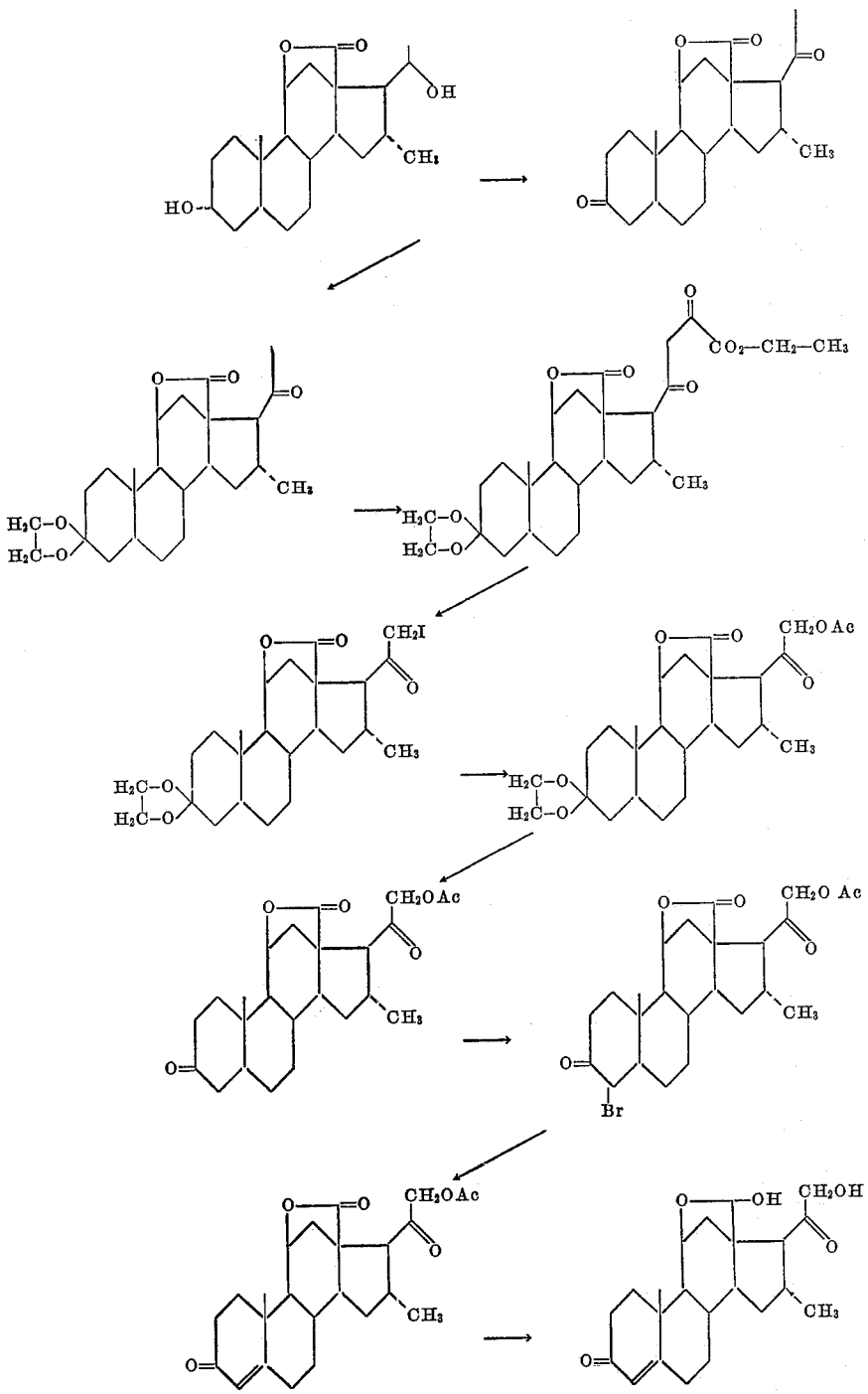

The acyl radical of the compounds of the invention is the acyl radical of an organic carboxylic acid of 1 to 18 carbon atoms. Suitable carboxylic acids are the alkanoic and alkenoic acids such as acetic acid, trimethyl acetic acid, propionic acid, 4,4-dimethyl pentanoic acid, undecylenic acid; cycloalkanoic acids such as β-cyclopentyl propionic acid; arylalkanoic acids such as phenyl propionic acid; cycloalkyl acids such as hexahydrobenzoic acid and hexahydro-terephthalic acid; and arylcarboxylic acid such as benzoic acid and 3,5-dinitrobenzoic acid.

The isomers of the 3α-acyloxy-11-oxo-18,20-oxido-16α-methyl-5β-pregnane and the 3α-acyloxy-11-oxo-20-hydroxy-16α-methyl-5β-pregnane may be isolated if desired, but the process may be operated with mixtures of the isomers without adverse effects.

The starting compounds, the 3α-acyloxy-11,20-dioxo-16α-methyl-5β-pregnanes, are obtained by the process described by Sarett et al. (J.A.C.S., vol. 80, 1958, page 3160).

In the following examples there are described several preferred embodiments to illustrate the invention. However, it should be understood that the invention is not intended to be limited to the specific embodiments.

EXAMPLE.—PREPARATION OF THE 18-11 LACTONE OF 3α,11β,20β-TRIHYDROXY-16α-METHYL-5β-PREGNANE-18β-OIC ACID

*Stage A.—Preparation of 3α-acetoxy-11-oxo-20-hydroxy-16α-methyl-5β-pregnane (III)*

3α - acetoxy-16α-methyl-11,20-dioxo-5β-pregnane (II) was dissolved in 40 volumes of absolute ethanol by heating to around 40° C. The solution was cooled to 20° C., 0.2 part of sodium borohydride was added and the mixture was agitated for one hour. Then 0.5 volume of acetic acid was added.

The reaction mixture was then poured into 80 volumes of water. The crystalline precipitate obtained was filtered, washed with water until the wash water was neutral and finally dried at 80° C.

The precipitate was a mixture of the 20α- and 20β-hydroxy isomers of 3α-acetoxy-11-oxo-20-hydroxy-16α-methyl-5β-pregnane (III).

The raw reduction product was taken up with methylene chloride, the solution was concentrated to a small volume and was added to ethyl acetate. The removal of the solvent was continued until crystallization occurred at the elevated temperature. The two isomers were separated through selective crystallization from methylene chloride, then from ethyl acetate. This operation was repeated several times. The yield of the 20β-isomer of 3α - acetoxy - 11 - oxo - 20 - hydroxy - 16α - methyl - 5β-pregnane was of the order of 60%; M.P.=208° C., specific rotation $[\alpha]_D^{20}=+58°\pm1$ (c.=1% in chloroform).

The product was soluble in chloroform, ethanol, benzene, acetone, slightly soluble in ether, insoluble in water and dilute aqueous acids. Dilute aqueous alkalis caused saponification in the 3-position.

This compound is not described in the literature.

The 20α-hydroxy isomer of 3α-acetoxy-11-oxo-20-hydroxy-16α-methyl-5β-pregnane was recovered from the dry residue of the mother liquors of the purification of the 20β-isomer. This dry residue was taken up in benzene, subjected to chromatography on alumina, washed with acid and eluted with benzene. The chromatography was repeated again and the 20α-isomer was recrystallized from ether. A third chromatography over alumina with a mixture of cyclohexane and benzene in equal parts was made and elution was effected with the same mixture.

Crystallization was made at elevated temperatures by solution in methylene chloride with addition of cyclohexane and distillation of the solvents. About 6% of the 20α-isomer of 3α-acetoxy-11-oxo-20-hydroxy-16α-methyl-5β-pregnane was obtained, having a melting point of 165° C., and a specific rotation $[\alpha]_D^{20}=+67°\pm1$ (c.=1% in chloroform).

The product was soluble in chloroform, ethanol, acetone, benzene, slightly soluble in ether, insoluble in water and dilute aqueous acids. Dilute aqueous alkalis saponified the 3-position.

This compound is not described in the literature.

*Analysis.*—$C_{24}H_{38}O_4$; molecular weight=390.54. Calculated: C, 73.80%; H, 9.81%. Found: C, 74.0%; H, 9.8%.

*Stage B.—Preparation of 3α-acetoxy-11-oxo-18,20-oxido-16α-methyl-5β-pregnane (IV); isomers 18,20α and 20β-oxido*

(a) *Preparation of the 18,20β-oxido isomer.*—60 gms. of 3α - acetoxy-11-oxo-20β-hydroxy-16α-methyl-5β-pregnane were dissolved in 1.6 liters of benzene and about 200 cc. of benzene were distilled off in order to remove all traces of moisture. 120 gms. of lead tetraacetate were introduced quite rapidly. The reaction mixture was maintained at reflux under agitation and irradiation with white light for six hours (irradiation with a 100 watt lamp at 3 cm. distance).

The mixture was cooled. The excess of lead tetraacetate was decomposed by the addition of 20 cc. of ethylene glycol.

Next, the reaction mixture was washed successively with water, then with a saturated sodium bicarbonate solution and again with water. The benzene layer containing 3α-acetoxy - 11 - oxo-18,20β-oxido-16α-methyl-5β-pregnane was dried over magnesium sulfate and evaporated to dryness.

The raw product was taken up in petroleum ether and allowed to crystallize overnight. The crystals were washed by trituration with cyclohexane, then with petroleum ether.

Purification was made by chromatography over alumina (acid-washed) in benzene and recrystallization from cyclohexane. After recovery of the mother liquor by chromatography on alumina, 29.573 gms. of 3α-acetoxy-11-oxo-18,20β-oxido-16α-methyl-5β-pregnane were obtained. This was a yield of 50% of a product having a melting point of 135° C. and a specific rotation $$[\alpha]_D^{20}=+65°\pm1 \text{ (c.=1\% in chloroform)}.$$

The product was soluble in ethanol, ether, acetone, benzene, chloroform, slightly soluble in cyclohexane, petroleum ether, insoluble in water and dilute aqueous acids. Dilute aqueous alkalis caused saponification in the 3-position.

The product is not described in the literature.

*Analysis.*—$C_{24}H_{36}O_4$; molecular weight=388.528. Calculated: C, 74.19%; H, 9.34%; O, 16.47%. Found: C, 74.0%; H, 9.2%; O, 17.0%.

(b) *Preparation of the 18,20α-oxido isomer.*—1.5 gms. of 3α - acetoxy-11-oxo-20α-hydroxy-16α-methyl-5β-pregnane were dissolved in 75 cc. of benzene and then 25 cc. of solvent were distilled off in order to eliminate all trace of moisture. 3 gms. of lead tetraacetate were introduced quite rapidly under agitation and under luminous activation (as indicated above). The reaction mixture was maintained for about two hours at reflux temperature, then cooled in the absence of luminous irradiation. The excess lead tetraacetate was destroyed by addition of 0.5 cc. of ethylene glycol.

Next, the benzene solution of the reaction mixture was washed successively with water, with saturated sodium bicarbonate solution and again with water. The benzene layer contained 3α - acetoxy - 11 - oxo-18,20α-oxido-16α-methyl-5β-pregnane and was dried over magnesium sulfate and evaporated to dryness.

The raw product was taken up in ether. The solids were separated and recrystallized from mixed cyclohexane and methanol. 0.502 gm. of the compound were obtained having a melting point of 150° C. and a specific rotation [α]$_D^{20}$=+102°±1 (c.=1% in chloroform).

The product was soluble in ethanol, ether, benzene and chloroform, slightly soluble in cyclohexane, petroleum ether and isopropyl ether, and insoluble in water and dilute aqueous acids. Dilute aqueous alkalis caused saponification in the 3-position.

This product is not described in the literature.

Analysis.—$C_{24}H_{36}O_4$; molecular weight=388.528. Calculated: C, 74.19%; H, 9.34%. Found: C, 74.2%; H, 9.4%.

Stage C.—Preparation of 3α,20-dihydroxy-11,18-dioxo-18,20-oxido-16α-methyl-5β-pregnane (V)

16 gms. of 3α-acetoxy-11-oxo-18,20β-oxido-16α-methyl-5β-pregnane were dissolved in 160° cc. of acetic acid at 20° C. 56 cc. of a sulfochromic acid solution titrating 24.45 gms. of chromic acid per 100 cc. were then introduced under agitation at 20° C. into the solution. The reaction mixture was allowed to stand overnight at room temperature, then water was added. A gummy precipitate was formed. The suspension was extracted with methylene chloride several times, the organic extracts were united, washed with water, dried over magnesium sulfate and evaporated to dryness.

The residue was taken up with ether; the acid fraction was extracted by countercurrent extraction with a 1N solution of sodium hydroxide and finally the exhausted ethereal layer was extracted with the same sodium hydroxide solution.

The alkaline phases were united and washed with ether and acidified by hydrochloric acid until the pH was restored to 1. This caused a gummy precipitate.

The precipitate was extracted by methylene chloride. The extracts were washed with water, dried over magnesium sulfate and the solvent was evaporated. The crystalline paste obtained was washed by trituration with isopropyl ether and dried. After recrystallization from warm acetone, 4.686 gms. of 3α,20-dihydroxy-11,18-dioxo-18,20-oxido-16α-methyl 5β-pregnane were obtained, being a yield of about 30%. The product had a melting point of 210° C. and a specific rotation

[α]$_D^{20}$=+28°±1 (c.=1% in acetone).

The product was soluble in ethanol, acetone and dilute aqueous alkalis, very slightly soluble in benzene and chloroform and insoluble in water and dilute aqueous acids.

Formula: $C_{22}H_{32}O_5$; molecular weight=376.48. The product is not described in the literature.

3α,20-dihydroxy-11,18-dioxo-18,20-oxido-16α-methyl-5β-pregnane was also obtained starting from the 20α-isomer of 3α-acetoxy-11-oxo-18,20α-oxido-16α-methyl-5β - pregnane by dissolving 0.502 gm. of said 20α-isomer in 7.5 cc. of acetic acid and treating in the same fashion as in the case of the β-isomer with 1.75 cc. of the same sulfochromic acid solution. After the usual recovery steps and recrystallization from ether containing 10% acetone, 0.152 gm. of 3α,20-dihydroxy-11,18-dioxo-18,20-oxido-16α-methyl-5β-pregnane having a melting point of 210° C. identical with the preceding were obtained.

Stage D.—Preparation of the 18-11 lactone of 3α,11β,20β-trihydroxy-16α-methyl-5β-pregnane-18β-oic acid (I)

2 gms. of the compound produced in stage C were dissolved in 100 cc. of a 1 N sodium hydroxide solution. Then 1 gm. of sodium borohydride was added and the reaction mixture was placed on a water bath for about three hours. By the addition of hydrochloric acid, the reaction mixture was adjusted to a pH of 1 and heated to a temperature on the order of 80° C. for five minutes. The precipitate obtained was vacuum filtered, washed with water until the wash water was neutral, taken up by acetone and the solvent eliminated. The crystals obtained were washed with ether and dried at 80° C. 1.211 gms. of the 18-11 lactone of 3α,11β,20β-trihydroxy-16α-methyl-5β-pregnane-18β-oic acid were obtained, being a yield of 64%. This product had a melting point of 213° C. and a specific rotation [α]$_D^{20}$=+45°±1 (c.=1% in acetone).

The product was soluble in acetone, slightly soluble in dilute aqueous acids, insoluble in water, ether, benzene and chloroform.

Analysis.—$C_{22}H_{34}O_4$; molecular weight=362.49. Calculated: C, 72.89%; H, 9.45%. Found: C, 72.9%; H, 9.4%.

This product is not described in the literature.

Stage E.—Preparation of the 18-11 lactone of 3α,11β,20β-trihydroxy-16α-methyl-5β-pregnane-18β-oic acid 3α,20β-diacetate (I, R=COCH$_3$)

To 0.5 gm. of the compound produced in stage D was added 2 cc. of pyridine and 1 cc. of acetic anhydride. The reaction mixture was allowed to stand for twenty-four hours. Then, water was added under refrigeration. An oily layer was formed which crystallized after some time. The crystals were washed with water and dried at 80° C.

The product was purified by recrystallization in methylene chloride and isopropyl ether. 0.382 gm. of 18-11 lactone of 3α,11β,20β-trihydroxy-16α-methyl-5β-pregnane-18β-oic acid 3α,20β-diacetate were obtained having a melting point of 151–153° C. and a specific rotation [α]$_D^{20}$=+47°±1 (c.=1% in chloroform).

The product was soluble in ethanol, ether, acetone, benzene, chloroform, isopropyl ether, insoluble in water and dilute aqueous acids. Dilute aqueous alkalis caused saponification of the esterified groups.

Analysis.—$C_{26}H_{38}O_6$; molecular weight=444.56. Calculated: C, 69.93%; H, 8.58%. Found: C, 70.0%; H, 8.4%.

This product is not described in the literature.

Various modifications of the process of the present invention may be made without departing from the spirit or scope thereof, and it is to be understood that the invention be limited only as defined in the appended claims.

We claim:

1. A compound having the formula

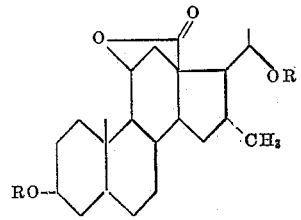

wherein R is a member selected from the group consisting of hydrogen and an acyl radical of an organic carboxylic acid having 1 to 18 carbon atoms.

2. The 18-11 lactone of 3α,11β,20β-trihydroxy-16α-methyl-5β-pregnane-18β-oic acid.

3. The 18-11 lactone of 3α,11β,20β-trihydroxy-16α-methyl-5β-pregnane-18β-oic acid-3,20-diacetate.

4. 3α - acetoxy - 11 - oxo-20α-hydroxy-16α-methyl-5β-pregnane.

5. 3α-acetoxy-11-oxo-20β-hydroxy-16α - methyl - 5β-pregnane.

6. 3α-acetoxy-11-oxo-18,20β-oxido - 16α - methyl - 5β-pregnane.

7. 3α-acetoxy-11-oxo-18,20α-oxido - 16α - methyl - 5β-pregnane.

8. 3α,20-dihydroxy-11,18-dioxo-18,20-oxido-16α-methyl-5β-pregnane.

9. The process of preparing a compound having the formula

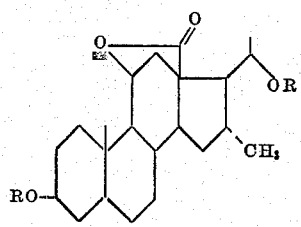

wherein R is a member selected from the group consisting hydrogen and an acyl radical of an organic carboxylic acid having 1 to 18 carbon atoms which comprises reducing 3α-acyloxy-11,20-dioxo-16α-methyl - 5β - pregnane to form 3α - acyloxy - 11-oxo-20-hydroxy-16α-methyl-5β-pregnane, cyclizing the latter to form 3α-acyloxy-11-oxo-18,20-oxido-16α-methyl-5β-pregnane, oxidizing and saponifying the 18,20-oxido product to form 3α,20-dihydroxy-11,18-dioxo-18,20-oxido-16α-methyl-5β-pregnane, reducing the latter 18,20-oxido product to form the 18-11 lactone of 3α,11β,20β-trihydroxy-16α-methyl - 5β - pregnane-18β-oic acid and recovering the desired product.

10. The process of claim 9 wherein the reduction of 3α - acyloxy - 11,20 - dioxo-16α-methyl-5β-pregnane is effected in the presence of sodium borohydride in absolute ethanol.

11. The process of claim 9 wherein the cyclization of 3α-acyloxy - 11 - oxo-20-hydroxy-16α-methyl-5β-pregnane is effected with lead tetraacetate in benzene at elevated temperatures with activation by light.

12. The process of claim 9 wherein the oxidation of 3α-acyloxy-11-oxo-18,20-oxido-16α-methyl - 5β - pregnane is carried out with sulfochromic acid and at room temperatures and is then saponified with sodium hydroxide at room temperatures.

13. The process of claim 9 wherein the reduction of 3α,20 - dihydroxy - 11,18-dioxo-18,20-oxido-16α - methyl-5β-pregnane is effected in the presence of sodium borohydride.

14. The process of preparing a compound having the formula

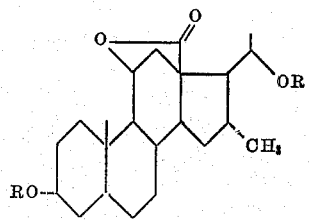

wherein R is a member selected from the group consisting of hydrogen and an acyl radical of an organic carboxylic acid having 1 to 18 carbon atoms which comprises reducing 3α-acyloxy-11,20-dioxo-16α-methyl-5β-pregnane with sodium borohydride in absolute ethanol to form 3α-acyloxy-11-oxo-20-hydroxy-16α-methyl-5β - pregnane, cyclizing the latter with lead tetraacetate in benzene at elevated temperatures and activated with light to form 3α-acyloxy - 11 - oxo - 18,20-oxido-16α-methyl-5β-pregnane, oxidizing the 18,20-oxido product with sulfochromic acid at room temperature and saponifying in the presence of sodium hydroxide at room temperatures to form 3α,20-dihydroxy - 11,18 - dioxo-18,20-oxido-16α - methyl - 5β-pregnane, reducing the latter 18,20-oxido product with sodium borohydride and recovering the desired product.

No references cited.